US009648398B2

(12) United States Patent
Eyer

(10) Patent No.: US 9,648,398 B2
(45) Date of Patent: *May 9, 2017

(54) VIRTUAL CHANNEL DECLARATIVE SCRIPT BINDING

(71) Applicant: SATURN LICENSING, LLC., New York, NY (US)

(72) Inventor: Mark Kenneth Eyer, Woodinville, WA (US)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/504,984

(22) Filed: Oct. 2, 2014

(65) Prior Publication Data

US 2015/0020146 A1 Jan. 15, 2015

Related U.S. Application Data

(63) Continuation of application No. 13/041,743, filed on Mar. 7, 2011, now Pat. No. 8,898,723.

(Continued)

(51) Int. Cl.
*H04N 7/16* (2011.01)
*H04N 21/81* (2011.01)
(Continued)

(52) U.S. Cl.
CPC ......... *H04N 21/8173* (2013.01); *H04N 21/00* (2013.01); *H04N 21/443* (2013.01); *H04N 21/478* (2013.01); *H04N 21/8166* (2013.01)

(58) Field of Classification Search
CPC . H04N 21/435; H04N 21/235; H04N 21/4622
(Continued)

(56) References Cited

U.S. PATENT DOCUMENTS 5,694,163 A * 12/1997 Harrison .................. H04N 7/14
348/468
5,724,424 A * 3/1998 Gifford ................. G06Q 10/087
340/5.41

(Continued)

FOREIGN PATENT DOCUMENTS

GB 2460676 A 6/2008
WO WO 02/17639 A2 2/2002

(Continued)

OTHER PUBLICATIONS

U.S. Appl. No. 13/930,814, filed Jun. 28, 2013, Fay.

(Continued)

*Primary Examiner* — Annan Shang
(74) *Attorney, Agent, or Firm* — Oblon, McClelland, Maier & Neustadt, L.L.P.

(57) ABSTRACT

A method consistent with certain implementations involves receiving a triggerable declarative object (TDO) at a digital television receiver device that carries out a programmed script upon execution; the programmed script including a parameter discovery function that determines an operational parameter of the television receiver device and further includes a programmed function; initiating the execution of the TDO in order to initiate execution of the script on a processor of the television receiver device; running the script on the processor of the television receiver device in order to discover the operational parameter and in order to carry out the programmed function; and where the programmed function is conditional upon the discovered operational parameter of the television receiver. This abstract is not to be considered limiting, since other embodiments may deviate from the features described in this abstract.

22 Claims, 4 Drawing Sheets

Related U.S. Application Data

(60) Provisional application No. 61/375,405, filed on Aug. 20, 2010.

(51) Int. Cl.
  *H04N 21/00* (2011.01)
  *H04N 21/443* (2011.01)
  *H04N 21/478* (2011.01)

(58) Field of Classification Search
  USPC .................. 725/131–142; 709/217–232
  See application file for complete search history.

(56) References Cited

U.S. PATENT DOCUMENTS

| | | | |
|---|---|---|---|
| 5,844,620 A | 12/1998 | Coleman et al. | |
| 6,240,555 B1* | 5/2001 | Shoff | H04N 5/44543 348/E5.104 |
| 6,330,719 B1* | 12/2001 | Zigmond et al. | 725/121 |
| 6,483,547 B1 | 11/2002 | Eyer | |
| 6,557,172 B1 | 4/2003 | Carr | |
| 6,571,392 B1* | 5/2003 | Zigmond | H04H 20/93 348/E5.002 |
| 6,604,242 B1 | 8/2003 | Weinstein et al. | |
| 6,938,270 B2 | 8/2005 | Blackketter et al. | |
| 7,080,399 B1* | 7/2006 | Yanagawa | H04L 12/40117 725/109 |
| 7,117,268 B2* | 10/2006 | Parent | H04L 29/06 709/201 |
| 7,127,491 B2* | 10/2006 | Zirnstein, Jr. | G06F 9/546 709/206 |
| 7,284,202 B1 | 10/2007 | Zenith | |
| 7,421,741 B2 | 9/2008 | Phillips, II et al. | |
| 7,600,241 B2 | 10/2009 | Zigmond et al. | |
| 7,606,255 B2* | 10/2009 | Smith | H04N 7/16 370/312 |
| 7,693,270 B2* | 4/2010 | Beck | H04L 65/1069 379/142.16 |
| 7,966,638 B2* | 6/2011 | Gossweiler, III | H04N 21/235 725/133 |
| 8,127,026 B2* | 2/2012 | Tsukamoto | G06F 8/36 709/228 |
| 8,244,797 B2* | 8/2012 | Suito | G06Q 30/06 709/203 |
| 8,549,100 B2* | 10/2013 | Matsubara | H04L 67/325 709/203 |
| 8,595,783 B2 | 11/2013 | Dewa | |
| 8,705,933 B2 | 4/2014 | Eyer | |
| 8,839,338 B2 | 9/2014 | Eyer | |
| 8,842,974 B2 | 9/2014 | Kitazato | |
| 2002/0088008 A1 | 7/2002 | Markel | |
| 2002/0162118 A1 | 10/2002 | Levy et al. | |
| 2003/0018745 A1 | 1/2003 | McGowen et al. | |
| 2003/0084180 A1* | 5/2003 | Azami | H04N 21/235 709/231 |
| 2003/0093812 A1 | 5/2003 | Chang et al. | |
| 2003/0229900 A1 | 12/2003 | Reisman | |
| 2004/0022278 A1 | 2/2004 | Thomas et al. | |
| 2005/0148296 A1 | 7/2005 | Kopra et al. | |
| 2006/0168064 A1* | 7/2006 | Huynh | G06Q 10/107 709/206 |
| 2007/0006277 A1* | 1/2007 | Mills | H04N 7/173 725/153 |
| 2007/0061724 A1 | 3/2007 | Slothouber et al. | |
| 2007/0186246 A1* | 8/2007 | Goldhor | H04N 5/76 725/46 |
| 2008/0082922 A1 | 4/2008 | Biniak et al. | |
| 2008/0126477 A1 | 5/2008 | Kim | |
| 2009/0254996 A1* | 10/2009 | Conus | H04N 7/163 726/27 |
| 2010/0180007 A1 | 7/2010 | Suh et al. | |
| 2010/0269140 A1* | 10/2010 | Shin | H04N 5/44543 725/54 |
| 2011/0088075 A1 | 4/2011 | Eyer | |
| 2011/0142417 A1* | 6/2011 | Wilson | H04N 5/76 386/250 |
| 2011/0243536 A1 | 10/2011 | Eyer | |
| 2011/0246488 A1 | 10/2011 | Eyer | |
| 2011/0247028 A1 | 10/2011 | Eyer | |
| 2011/0298981 A1 | 12/2011 | Eyer | |
| 2011/0299827 A1 | 12/2011 | Eyer | |
| 2011/0302599 A1 | 12/2011 | Eyer | |
| 2011/0302611 A1 | 12/2011 | Eyer | |
| 2011/0307920 A1 | 12/2011 | Blanchard et al. | |
| 2012/0044418 A1 | 2/2012 | Eyer | |
| 2012/0047531 A1 | 2/2012 | Eyer | |
| 2012/0050619 A1 | 3/2012 | Kitazato et al. | |
| 2012/0050620 A1 | 3/2012 | Kitazato | |
| 2012/0054214 A1 | 3/2012 | Yamagishi et al. | |
| 2012/0054235 A1 | 3/2012 | Kitazato et al. | |
| 2012/0054267 A1 | 3/2012 | Yamagishi et al. | |
| 2012/0054268 A1 | 3/2012 | Yamagishi | |
| 2012/0054783 A1 | 3/2012 | Yamagishi | |
| 2012/0054784 A1 | 3/2012 | Kitazato et al. | |
| 2012/0060197 A1 | 3/2012 | Kitahara et al. | |
| 2012/0063508 A1 | 3/2012 | Hattori et al. | |
| 2012/0072965 A1 | 3/2012 | Dewa | |
| 2012/0081508 A1 | 4/2012 | Kitazato | |
| 2012/0081607 A1 | 4/2012 | Kitazato | |
| 2012/0082266 A1 | 4/2012 | Kitazato et al. | |
| 2012/0084802 A1 | 4/2012 | Kitazato | |
| 2012/0084824 A1 | 4/2012 | Kitazato | |
| 2012/0084829 A1 | 4/2012 | Kitazato | |
| 2012/0185888 A1 | 7/2012 | Eyer et al. | |
| 2012/0253826 A1 | 10/2012 | Kitazato et al. | |
| 2012/0274848 A1 | 11/2012 | Kitahara et al. | |
| 2012/0275764 A1 | 11/2012 | Eyer | |
| 2013/0024894 A1 | 1/2013 | Eyer | |
| 2013/0024897 A1 | 1/2013 | Eyer | |
| 2013/0031569 A1 | 1/2013 | Kitazato et al. | |
| 2013/0036440 A1 | 2/2013 | Eyer | |
| 2013/0055313 A1 | 2/2013 | Eyer | |
| 2013/0103716 A1 | 4/2013 | Yamagishi | |
| 2013/0119694 A1* | 5/2013 | Garceau | B60P 3/34 296/26.13 |
| 2013/0145414 A1 | 6/2013 | Yamagishi | |
| 2013/0167171 A1 | 6/2013 | Kitazato et al. | |
| 2013/0191860 A1 | 7/2013 | Kitazato et al. | |
| 2013/0198768 A1 | 8/2013 | Kitazato | |
| 2013/0201399 A1 | 8/2013 | Kitazato et al. | |
| 2013/0205327 A1 | 8/2013 | Eyer | |
| 2013/0212634 A1 | 8/2013 | Kitazato | |
| 2013/0215327 A1 | 8/2013 | Kitazato et al. | |
| 2013/0250173 A1 | 9/2013 | Eyer | |
| 2013/0254824 A1 | 9/2013 | Eyer | |
| 2013/0282870 A1 | 10/2013 | Dewa et al. | |
| 2013/0283311 A1 | 10/2013 | Eyer | |
| 2013/0283328 A1 | 10/2013 | Kitazato | |
| 2013/0291022 A1 | 10/2013 | Eyer | |
| 2013/0291049 A1 | 10/2013 | Kitazato | |
| 2013/0340007 A1 | 12/2013 | Eyer | |
| 2014/0013347 A1 | 1/2014 | Yamagishi | |
| 2014/0013379 A1 | 1/2014 | Kitazato et al. | |
| 2014/0020038 A1 | 1/2014 | Dewa | |
| 2014/0020042 A1 | 1/2014 | Eyer | |
| 2014/0040965 A1 | 2/2014 | Kitazato et al. | |
| 2014/0040968 A1 | 2/2014 | Kitazato et al. | |
| 2014/0043540 A1 | 2/2014 | Kitazato et al. | |
| 2014/0053174 A1 | 2/2014 | Eyer et al. | |
| 2014/0067922 A1 | 3/2014 | Yamagishi et al. | |
| 2014/0099078 A1 | 4/2014 | Kitahara et al. | |
| 2014/0122528 A1 | 5/2014 | Yamagishi | |
| 2014/0137153 A1 | 5/2014 | Fay et al. | |
| 2014/0137165 A1 | 5/2014 | Yamagishi | |
| 2014/0150040 A1 | 5/2014 | Kitahara et al. | |
| 2014/0157304 A1 | 6/2014 | Fay et al. | |
| 2014/0173661 A1 | 6/2014 | Yamagishi | |
| 2014/0186008 A1 | 7/2014 | Eyer | |
| 2014/0208375 A1 | 7/2014 | Fay et al. | |
| 2014/0208380 A1 | 7/2014 | Fay et al. | |

(56) References Cited

U.S. PATENT DOCUMENTS

| | | |
|---|---|---|
| 2014/0229580 A1 | 8/2014 | Yamagishi |
| 2014/0229979 A1 | 8/2014 | Kitazato et al. |
| 2014/0253683 A1 | 9/2014 | Eyer et al. |

FOREIGN PATENT DOCUMENTS

| | | |
|---|---|---|
| WO | WO 02/45406 | 6/2002 |
| WO | WO 2008/069501 A1 | 6/2008 |
| WO | WO 2009/057050 | 5/2009 |

OTHER PUBLICATIONS

U.S. Appl. No. 13/930,880, filed Jun. 28, 2013, Fay et al.
U.S. Appl. No. 13/934,549, filed Jul. 3, 2013, Fay et al.
U.S. Appl. No. 13/934,615, filed Jul. 3, 2013, Eyer.
U.S. Appl. No. 13/955,130, filed Jul. 31, 2013, Fay.
U.S. Appl. No. 14/275,231, filed May 12, 2014, Eyer.
U.S. Appl. No. 14/295,695, filed Jun. 4, 2014, Eyer.
U.S. Appl. No. 14/457,290, filed Aug. 12, 2014, Eyer.
U.S. Appl. No. 14/458,310, filed Aug. 13, 2014, Eyer.
U.S. Appl. No. 14/490,263, filed Sep. 18, 2014, Blanchard et al.
U.S. Appl. No. 14/493,661, filed Sep. 23, 2014, Yamagishi.
U.S. Appl. No. 14/493,721, filed Sep. 23, 2014, Kitazato.
U.S. Appl. No. 14/504,455, filed Oct. 2, 2013, Fay.
Albrecht, "TV Multi-Taskers Can Get Jacked," The GigaOm Network, Mar. 15, 2008.
Anonymous, "TiVo Series3 HD DVR (32 HD Hours) Product Summary," CNET Editor's Review, Sep. 11, 2006 (Updated Sep. 4, 2008).
Freeman, "Implementing the ATSC PSIP Standard," Softprose Inc., Oct. 26, 2006.
Huang et al., "Performance Analysis of Data Placement and Retrieval Schemes for Video Servers Based on Response Time Guaranteed," IEEE Explore, Sep. 1997.
Shuck, "Roundbox's Mobile TV Widgets Marry Mobile TV, Web," Broadcast Engineering, May 5, 2009.
Soares, "Interactive Television in Brazil: System Software and the Digital Divide," Telemidia Lab Catholic University of Rio De Janiero, 2007.
Verizon, "Verizon Launches New Wave of Interactive Features for FiOS Tv Customers in North Texas," Verizon News Release, Oct. 24, 2008.
Verizon, "Verizon Ushers in a New Era of Television Entertainment With the Debut of FiOS TV in Allentown, PA," Verizon PR Newswire, November.
Williams et al., "Virtual Personalised Channels: Video Conducting of Future TV Broadcasting," EWIMT 2005: Second European Workshop on the Integration of Knowledge, Semantic and Digital Media Technologies, Dec. 2005.
Extended European Search Report issued Nov. 25, 2013 in Patent Application No. 11818493.6.
Office Action issued Nov. 29, 2013 in Korean Patent Application No. 10-2011-7009000 (with English language translation).
"Advanced television enhancement forum specification (ATVEF)", ATVEF, XP-002142259, Feb. 2, 1999, 33 pages.
Michael A. Dolan, "Report on television data applications", NIST GCR 01-818, XP-017513805, Oct. 2, 2002, pp. 1-40.
Office Action issued Aug. 15, 2014, in People's Republic of China Patent Application No. 201180038974.3 (with English-language translation).
Office Action mailed Sep. 18, 2014, in European Patent Application No. 11818493.6.
Office Action issued in People's Republic of China Patent Application No. 201180038974.3; 19 pgs., (with English language translation).
Notification of Transmittal of the International Search Report and the Written Opinion of the International Searching Authority, or the Declaration, 12 pgs., mailed Jun. 2, 2011.

\* cited by examiner

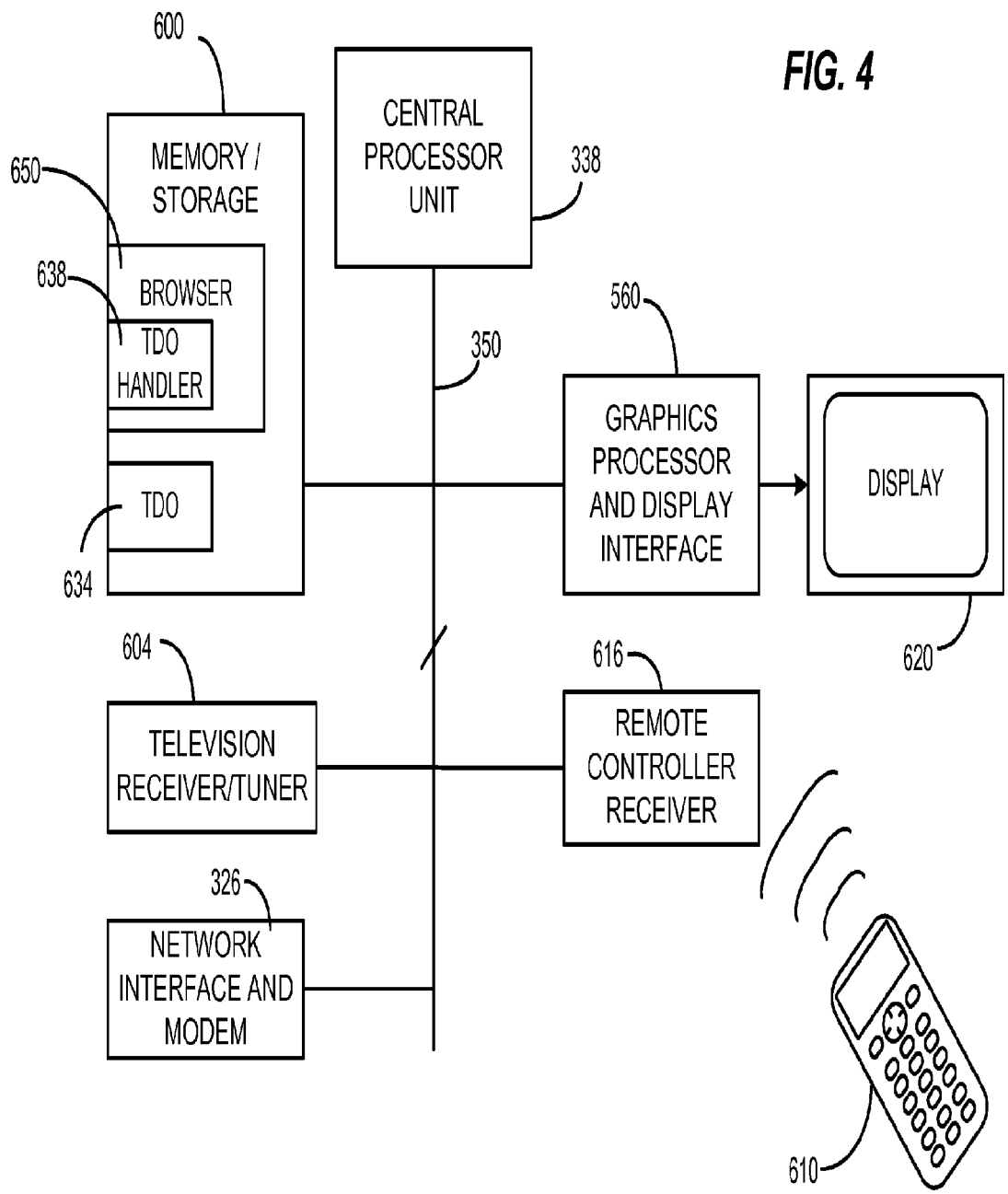

VIRTUAL CHANNEL DECLARATIVE SCRIPT BINDING

CROSS REFERENCE TO RELATED DOCUMENTS

This application is a continuation application of and claims the benefit of priority under 35 U.S.C. §120 from U.S. Ser. No. 13/041,743, filed Mar. 7, 2011, which claims priority benefit of U.S. Provisional Patent Application No. 61/375,405 filed Aug. 20, 2010, entitled "Virtual Channel Declarative Object Script Binding" to Mark Eyer, the entire contents of both of which are hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

A triggerable declarative object (TDO) is a downloadable object created by a content creator or service provider, which includes declarative content (text, descriptive markup, graphics, scripts, and audio) whose function and behavior is tied in some way to digital television programming that it accompanies. Standards defining TDOs specify associated available behaviors, appearance, trigger actions, and transport methods for content and metadata.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 4 is a processor-centric block diagram of an example digital television receiver device consistent with certain embodiments of the present invention.

DETAILED DESCRIPTION

Figure 1:
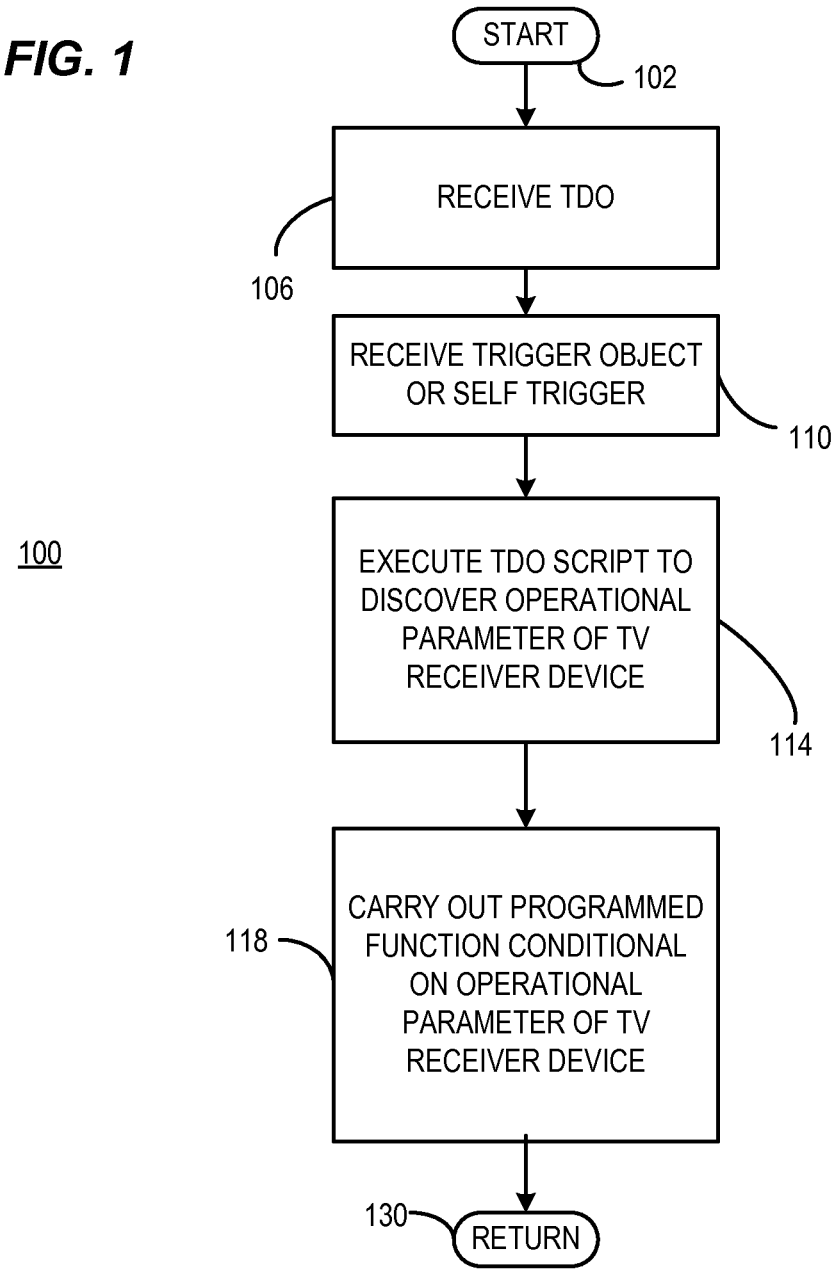
FIG. 1 is a flow chart of an example process executed at a digital television receiver device in a manner consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a script, a program module, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For purposes of this document, the terms "Synchronized Widget," "Triggered Declarative Object," "Triggered Downloadable Object," and "Triggerable Declarative Object" are used synonymously and interchangeably. Use of this term and related terms are generally as defined and explained in detail in U.S. patent application Ser. No. 12/959,529 filed Dec. 3, 2010 entitled "Announcement of Triggered Declarative Objects" to Blanchard et al. which is hereby incorporated by reference. However, the Blanchard application defines the content of the TDO and trigger somewhat more rigorously than is required in the general cases since many attributes defined therein as being a part of a TDO could be situated in the trigger or vice versa or not present at all depending upon the function and triggering of a particular TDO. As used herein, the term Triggerable Declarative Object (TDO) is a downloadable software object created by a content creator or service provider. Generally, such objects have declarative content (text, descriptive markup, graphics, scripts, and audio) whose function and behavior is tied in some way to the television programming that it accompanies. Note that a TDO is generally considered as "declarative" content to distinguish it from "executable" content such as a Java applet or an application that runs on an operating system platform. While considered declarative, a TDO supports a scripting language that is an object-oriented programming language. The TDO, in examples shown herein, are received from a service provider in advance of a time defined by a trigger object (as explained below) so that the TDO is available when the trigger arrives. Moreover, an explicit trigger signal may not be necessary and a TDO may be self-triggering or triggered by some action other than receipt of a trigger signal. Various standards bodies may define associated available behaviors, appearance, trigger actions, and transport methods for content and metadata for a TDO. Additionally, requirements regarding timing accuracy of TDO behaviors relative to audio/video may be defined by standards bodies.

As used herein a "trigger" or "announcement trigger" is a data object, bound to a particular program segment that references a specific TDO may be acquired, such as a file name or identifier for an object that has already been downloaded. Requirements regarding timing accuracy of triggers relative to audio/video may also eventually be dictated by standards bodies. Certain TDOs will only make sense in conjunction with a certain program. An example is a TDO that collects viewer response data, such as voting on a game show or contest.

With regard to the exact nature of TDOs and triggers, certain information can be provided in either the TDO or the trigger without limitation. However, the two objects operate in cooperation to produce a desired function when the TDO is executed in a digital television receiver device's internal processor.

The present subject matter pertains to advanced interactive digital television systems. In such systems, the user's experience of linear TV programming is enhanced with interactive elements that are synchronized with the content of the program material. New standards are expected to define the platform in the receiving device that supports the execution of scripted behaviors. The system is built on the concept of "triggerable declarative objects," or "TDOs" as discussed above.

Implementations consistent with certain embodiments of the present invention operate to extend the capabilities of the TDO, offering the author of the TDO's script access to information about the virtual channel the viewer is currently tuned to and current operational parameters of the television receiver device. Such information can allow the same TDO to be used in multiple contexts, such as on more than one channel of the broadcaster's channel group. The information is also useful as part of the service reporting function.

A digital broadcaster often delivers more than one programming channel within the 6 MHz band licensed to that broadcaster. The ATSC broadcast system, for example, offers sufficient digital bandwidth to deliver an HD channel and one or two SD channels in the same Transport Stream multiplex. A portion of the available digital payload can also be dedicated to a mobile service, such as ATSC Mobile DTV.

Using the concept of the Triggerable Declarative Object (TDO), interactivity may be included within advanced digital broadcasts. The TDO delivers a service-provider (or broadcaster-) supplied script that can enhance the viewer's enjoyment of a program. In many cases, one TDO will be useable across more than one of the broadcaster's channel offerings, or (in the case of advertising), even across more than one different broadcaster.

For example, a TDO may accompany an advertisement for a certain product. That same advertisement may appear on any one of a broadcaster's several programming channels, or on a different broadcaster's channel. It might accompany HD, SD, or Mobile DTV content. The script author may want to adjust or alter the behavior of the TDO depending on the channel that the TDO is currently playing on or the resolution of the video it is being carried with. Therefore, the inventor has noted that some mechanism is needed to allow the script to be responsive to the environment within which it is running, in this case, the currently tuned channel number or video resolution.

TDO behavior that the script author may want to make conditional upon either the virtual channel or the video resolution includes (but is not limited to):
  selection of the graphics and fonts appropriate to the screen size;
  management and reporting of service usage (the currently tuned channel may, for instance, be an important aspect of the service reporting data); and
  selection of text prompts appropriate to the current channel, such as program schedule, currently tuned program or channel name, etc.

In preferred implementations, the TDO should perform important service usage reporting functions for the benefit of the broadcaster. Therefore, the TDO should be able to access certain information pertaining to the usage of the service, including which channel the user is tuned to, which audio track is being accessed (which language, or whether an accessibility track such as Hearing Impaired [HI] or Visually Impaired [VI] is being used), and whether or not closed captioning is turned on.

In order to address this issue, a script binding can be defined to expose and make available to the script certain parameters known by the receiver that is executing the TDO. These parameters include the virtual channel number (see ATSC A/65), the channel name, the TSID value of the Transport Stream, which audio stream is being accessed, and some MPEG-2 parameters.

The script language adopted for TDOs is expected to be based on EcmaScript, which is standardized in ECMA-262. A script binding definition can be made as an extension to ECMA-262 which specifies object properties that can be used within a script. In preferred implementations, the standard may define an object called "tunedEnvironment" and associated properties as shown in the following Table follow (several of these parameters correspond to metadata delivered via A/65 PSIP), but other techniques could also be used without limitation:

| PROPERTY | RETURNS |
| --- | --- |
| channelTSID | the channel_TSID parameter of the currently tuned Transport Stream |
| majorChannelNumber | the major channel number of the currently tuned channel |
| minorChannelNumber | the minor channel number of the currently tuned channel |
| shortChannelName | the short_name parameter of the currently tuned channel |
| programNumber | the program_number parameter of the currently tuned channel |
| eventID | the event_ID parameter of the current EIT event |
| captionsOn | true if closed captions are being displayed, false otherwise |

-continued

| PROPERTY | RETURNS |
|---|---|
| audioBsmod | the bsmod value of the currently selected audio stream (this identifies whether the stream is a Complete Main, Visually Impaired, or Hearing Impaired audio stream; see ATSC A/52) |
| langPref | the preferred language set by the user |
| displayRes | the resolution of the physical display, if known |
| displaySize | the size of the physical display, if known |

Referring now to FIG. 1, a flow chart 100 depicts an example process carried out in a manner consistent with certain implementations of the present invention starting at 102. At 106 a TDO is received from the service provider or broadcaster or may be retrieved from a web site or the like. At a later time, the trigger object is received, again as an object from the service provider or broadcaster at 110. At an appropriate time, the TDO is triggered by the trigger object at 114. In some instances, the TDO may be self-triggered or triggered without user interaction and is instructed to begin to execute its scripted operations at 114.

At 114, the script of the TDO first begins execution in order to first carry out a discovery operation wherein the script discovers one or more operational parameters of the television receiver device. Once this parameter (or parameters) is discovered, the digital television receiver device executes one or more programmed functions (programmed in the script) at 118, where the programmed function or functions are in some way conditional upon the operational parameter(s) discovered at 114. The routine then returns at 130 and normal functions of the television receiver device proceeds.

Figure 2:
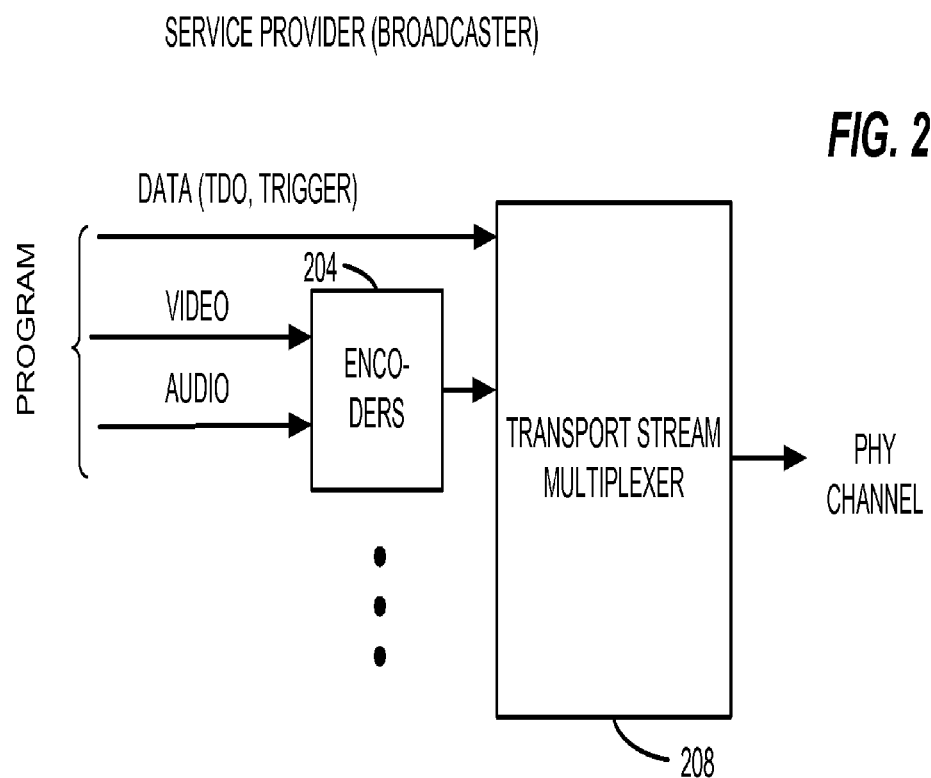
FIG. 2 is a block diagram of an example transmission side system that assembles digital television content in a manner consistent with certain embodiments of the present invention.

Referring now to FIG. 2, a basic diagram of an example service provider such as a broadcaster is depicted as 200. Generally speaking, a single service provider may provide multiple programs over one or more transport streams. The audio, video, caption data, etc. are provided to an encoder which encodes the data into packets suitable for distribution. The audio and video program material is encoded by audio and video encoders 204 which are then provided to a transport stream multiplexer 408 which then provides an output that can be distributed via a physical channel medium such as cable or satellite broadcast. In this discussion, the use of the term "Program" is generally consistent with that of the MPEG-2 Systems standard (ISO/IEC 13818-1). An MPEG-2 Program includes associated Elementary Stream components, such as for example one video Elementary Stream and one or more audio Elementary Streams. In accord with the implementation described above, the TDO data and its associated trigger data are also provided to the transport stream multiplexer for incorporation into the transport stream using any suitable coding. Multiple such program streams may be provided for and encoded and multiplexed into the transport stream at 208. The service provider may provide the content, TDOs etc. via cable, terrestrial broadcast, satellite or Internet without limitation.

Thus, at a service provider, a data stream may be assembled that includes a stream which pre-delivers a TDO to a digital television receiver device that carries out a programmed routine when the TDO is executed. The TDO can include a script that carries out a discovery operation to discover an operational parameter or parameters of the television receiver device and then carry out a programmed operation contingent upon the parameter or parameters discovered.

Figure 3:
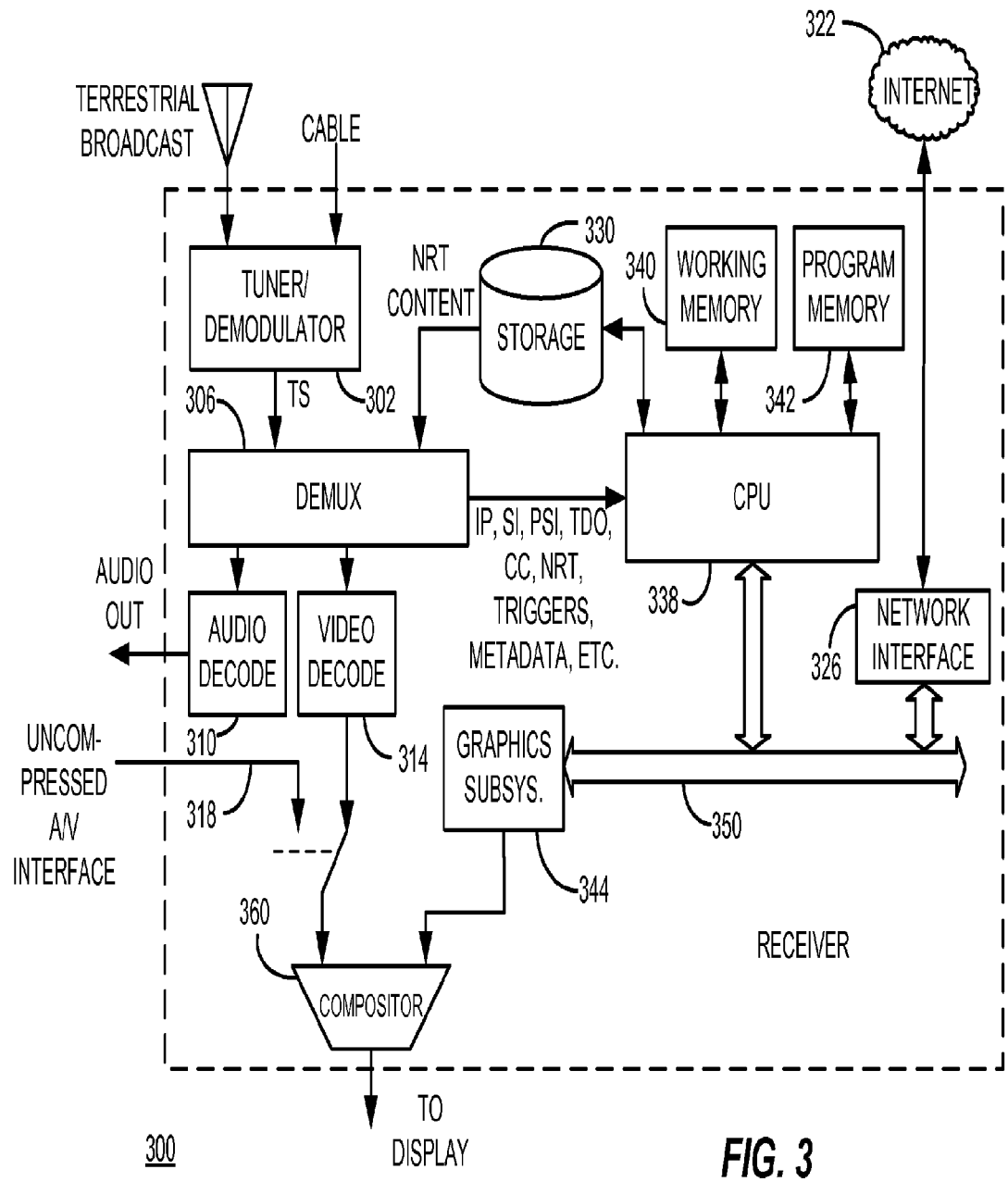
FIG. 3 is a block diagram of an example digital television receiver device consistent with certain embodiments of the present invention.

A receiver device is depicted as receiver 300 in FIG. 3 wherein content is received via any suitable source such as terrestrial broadcast, cable or satellite at a receiver 300's tuner/demodulator 302. The transport stream including TDOs, triggers, etc. from the tuner/demodulator 302 is demultiplexed at demultiplexer 306 into audio and video streams. The audio is decoded at an audio decoder 310 while the video is decoded at a video decoder 314. Uncompressed A/V data may also be received via an uncompressed A/V interface 318 that can be selectively utilized.

A/V content including TDOs, data and triggers may also be received via the Internet 322 via a network interface and modem 326. Network interface 326 also provides for a back channel for communication with a broadcaster or other service provider. Additionally, storage 330 can be provided for non-real time (NRT) or Internet-delivered content such as Internet Protocol Television (IPTV). The stored content can be played by demultiplexing at 306 in a manner similar to that of other sources of content. The receiver generally operates under control of a processor such as CPU 338 which is interconnected to working memory 340 and program memory 342 as well as a graphics subsystem 344 via one or more buses such as 350.

The CPU 338 receives closed caption data from the demultiplexer 306 as well as any other information such as TDO announcements and electronic programming guides used for rendering graphic content and passes the information to the graphics subsystem 344 and the images are composited at the compositor and video interface 360 to produce an output suitable for display on a video display.

The CPU 338 operates to carry out various processes within the context of the subject matter disclosed herein including generation of elements used in rendering of a user interface. CPU 338 further operates to execute any scripts contained in the TDO and/or its trigger(s). In one example, the script can cause display of a program guide or schedule for a particular TV program.

CPU 338 also operates to oversee control of the digital television receiver including the tuner/demodulator 302 and other television resources. Connection to such systems is not shown to avoid cluttering the drawing, but will be understood by those skilled in the art upon consideration of the present teachings. Hence, when the CPU 338 executes a TDO script command consistent with the teachings herein, the CPU 338 is enabled to determine operational parameters of the digital television receiver device, for example to determine a current channel, volume, caption status, etc. as dictated by the TDO's script and then to further function in a manner defined by the discovered operational parameter(s) to carry out a scripted function.

The operation in processing TDOs is depicted in a more processor-centric view in FIG. 4. Memory and storage 330, 340 and 342 are depicted collectively as 600 in FIG. 4 for convenience. Similarly, the various demodulators, decoders, etc. that initially process digital television signals are collectively depicted as 604. The television receiver device of FIG. 4 is further depicted as having a remote controller 610 which communicates with a remote controller interface 616. Additionally, the display 620 is depicted explicitly for completeness and may represent either an integral display as in a television set or a connected display device.

Memory 600 contains various functional program modules and data. When a TDO object is received, the TDO 634 is stored at memory 600 along with its script so that when executed that script can be retrieved for execution by the processor (or processors) 338. This TDO storage and execution is carried out at TDO handler 638 which may be integral to a browser 650. The TDO, when executed may present an announcement, generally defined within the TDO, to the viewer which permits the viewer to begin execution of a process or the TDO may self-execute depending on the nature of the scripted functions. User selections can be made by use of remote controller 610 as previously described.

Thus, a method consistent with certain implementations involves receiving a triggerable declarative object (TDO) at a digital television receiver device that carries out a programmed script upon execution; the programmed script including a parameter discovery function that determines an operational parameter of the television receiver device and further includes a programmed function; initiating the execution of the TDO in order to initiate execution of the script on a processor of the television receiver device; running the script on the processor of the television receiver device in order to discover the operational parameter and in order to carry out the programmed function; and where the programmed function is conditional upon the discovered operational parameter of the television receiver.

In certain implementations, the operational parameter defines a screen size and where the script programmed function operates in a manner designated for the defined screen size. In certain implementations, a font size is chosen based upon the screen size. In certain implementations, graphics are presented in a manner based upon the screen size. In certain implementations, the operational parameter includes a currently tuned channel. In certain implementations, the programmed function of the script selects prompts associated with the current channel. In certain implementations, the programmed function of the script displays a channel name. In certain implementations, the programmed function of the script displays a program guide. In certain implementations, the operational parameter discovered by the script comprises identification which audio track is being decoded. In certain implementations, the operational parameter discovered by the script comprises and indication of whether or not closed captioning is activated. In certain implementations, the operational parameter discovered by the script comprises an identification of a selected language. In certain implementations, the operational parameter discovered by the script comprises one or more of the following: a screen size, a currently tuned channel, a program name, a program schedule, an audio track, a closed caption status, and a selected language. In certain implementations, the operational parameter discovered by the script comprises a channel_TSID parameter for a currently tuned channel. In certain implementations, the operational parameter discovered by the script comprises at least one of a major channel number, a minor channel number, a short channel name, a program number, an event ID, a closed caption status, an audio language, and an audio bsmod value.

Any of the present processes can be carried out using a computer readable storage device such as a non-transitory storage medium storing instructions which, when executed on one or more programmed processors, carry out a any of the above-described methods.

Another method involves receiving a triggerable declarative object (TDO) at a digital television receiver device that carries out a programmed script upon execution; the programmed script including a parameter discovery function that determines a plurality of operational parameters of the television receiver device and further includes a plurality of programmed functions; where the operational parameters define a screen size and a currently tuned channel; initiating the execution of the TDO in order to initiate execution of the script on a processor of the television receiver device; running the script on the processor of the television receiver device in order to discover the operational parameters and in order to carry out the programmed functions; and where the programmed functions are conditional upon the discovered operational parameters of the television receiver by utilizing a font and graphics matched to the screen size.

A device consistent with certain implementations has a processor and a television receiver receiving and storing a triggerable declarative object (TDO) that includes a programmed script. The programmed script includes a parameter discovery function that determines an operational parameter of the television receiver device and further includes a programmed function. Running the script on the processor of the television receiver device causes it to discover the operational parameter and in order to carry out the programmed function. The programmed function is conditional upon the discovered operational parameter of the television receiver.

In certain implementations, the operational parameter defines a screen size and where the script programmed function operates in a manner designated for the defined screen size. In certain implementations, a font is selected based upon the screen size. In certain implementations, graphics are presented in a manner based upon the screen size. In certain implementations, the operational parameter includes a currently tuned channel. In certain implementations, the programmed function of the script selects prompts associated with the current channel In certain implementations, the programmed function of the script displays a channel name. In certain implementations, the programmed function of the script displays a program guide. In certain implementations, the operational parameter discovered by the script comprises identification which audio track is being decoded. In certain implementations, the operational parameter discovered by the script comprises and indication of whether or not closed captioning is activated. In certain implementations, the operational parameter discovered by the script comprises an identification of a selected language. In certain implementations, the operational parameter discovered by the script comprises one or more of the following: a screen size, a currently tuned channel, a program name, a program schedule, an audio track, a closed caption status, and a selected language. In certain implementations, the operational parameter discovered by the script comprises a channel_TSID parameter for a currently tuned channel. In certain implementations, the operational parameter discovered by the script comprises at least one of a major channel number, a minor channel number, a short channel name, a program number, an event ID, a closed caption status, an audio language, and an audio bsmod value.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as non-transitory storage devices including as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. The term non-transitory does not suggest that information cannot be lost by virtue of removal of power or other actions. Such alternative storage devices should be considered equivalents.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in operational flow, user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method, comprising:
receiving a triggerable declarative object (TDO) at a digital television receiver device that carries out a programmed function upon execution;
determining an existence of a particular value for an operational parameter of the television receiver device, the operation parameter of the television receiver device corresponding to capabilities of the television receiver device required by the programmed function; and
executing the programmed function using processing circuitry of the digital television receiver device, wherein execution of the programmed function is conditional upon the determined existence of the particular value for the operational parameter of the television receiver.

2. The method according to claim 1 wherein the operational parameter is a screen size and where the programmed function operates in a manner designated for the defined screen size.

3. The method according to claim 1 wherein the operational parameter includes a currently tuned channel.

4. The method according to claim 1, wherein the operational parameter is an identification of which audio track is being decoded.

5. The method according to claim 1, wherein the operational parameter is an indication of whether or not closed captioning is activated.

6. The method according to claim 1, wherein the operational parameter is an identification of a selected language.

7. The method according to claim 1, wherein the operational parameter includes information related to compatible media types.

8. A non-transitory computer readable medium storing instructions which, when executed on one or more programmed program circuitries, carry out a method comprising:
receiving a triggerable declarative object (TDO) at a digital television receiver device that carries out a programmed function upon execution;
determining an existence of a particular value for an operational parameter of the television receiver device, the operation parameter of the television receiver device corresponding to capabilities of the television receiver device required by the programmed function; and
executing the programmed function using processing circuitry of the digital television receiver device, wherein execution of the programmed function is conditional upon the determined existence of the particular value for the operational parameter of the television receiver.

9. The non-transitory computer readable medium according to claim 8, wherein the operational parameter is a screen size and where the programmed function operates in a manner designated for the defined screen size.

10. The non-transitory computer readable medium according to claim 8, wherein the operational parameter includes a currently tuned channel.

11. The non-transitory computer readable medium according to claim 8, wherein the operational parameter is an identification of which audio track is being decoded.

12. The non-transitory computer readable medium according to claim 8, wherein the operational parameter is an indication of whether or not closed captioning is activated.

13. The non-transitory computer readable medium according to claim 8, wherein the operational parameter is an identification of a selected language.

14. The non-transitory computer readable medium according to claim 8, wherein the operational parameter includes information related to compatible media types.

15. A television receiver device, comprising:
circuitry configured to
receive and store a triggerable declarative object (TDO) that carries out a programmed function upon execution;
determine an existence of a particular value for an operational parameter of the television receiver device, the operation parameter of the television receiver device corresponding to capabilities of the television receiver device required by the programmed function; and
execute the programmed function, wherein execution of the programmed function is conditional upon the determined existence of the particular value for the operational parameter of the television receiver.

16. The television receiver device according to claim 15, wherein the operational parameter is a screen size and where the programmed function operates in a manner designated for the defined screen size.

17. The television receiver device according to claim 16, wherein the defined screen size is a defined television screen size.

18. The television receiver device according to claim 15, wherein the operational parameter includes a currently tuned channel.

19. The television receiver device according to claim 15, wherein the operational parameter is an identification of which audio track is being decoded.

20. The television receiver device according to claim 15, wherein the operational parameter is an indication of whether or not closed captioning is activated.

21. The television receiver device according to claim 15, wherein the operational parameter is an identification of a selected language.

22. The television receiver device according to claim 15, wherein the operational parameter includes information related to compatible media types.

* * * * *